United States Patent [19]

Boilard

[11] Patent Number: 5,589,088
[45] Date of Patent: Dec. 31, 1996

[54] METHOD OF REGULATING DC CURRENT IN RESISTANCE WELDERS

[75] Inventor: Reno C. Boilard, Windsor, Canada

[73] Assignee: Medar, Inc., Farmington Hills, Mich.

[21] Appl. No.: 493,803

[22] Filed: Jun. 20, 1995

[51] Int. Cl.$^6$ ................................................ B23K 11/24
[52] U.S. Cl. .................................................... 219/110
[58] Field of Search ................................. 219/108, 110

[56] References Cited

U.S. PATENT DOCUMENTS

| | | | |
|---|---|---|---|
| 4,076,974 | 2/1978 | Gee | 219/108 |
| 4,885,451 | 12/1989 | Farrow et al. | 219/110 |
| 4,910,375 | 3/1990 | Izume | 219/110 |
| 5,310,984 | 5/1994 | Ratledge et al. | 219/110 |

*Primary Examiner*—Clifford C. Shaw

[57] ABSTRACT

A method of controlling a resistance welder of the type having a weld controller provided with memory lookup tables, a source of AC electrical power coupled to a welding transformer through a switch operated by the controller and welding electrodes for delivering pulses of electrical energy to a workpiece to be welded. A first set of data is stored in a first one of the memory lookup tables which corresponds to a set of firing angles that are related to a set of DC current values representing the percentage of the maximum amount of DC current that can be delivered to the worpiece based on a particular power factor for the circuit. A second set of data is stored in the second memory lookup table which is similar to the data in the first memory except that stored current values are for portions of AC pulses of weld energy. In the case of the first memory, the stored values of the DC current are corrected values that bear a nonlinear relationship to the actual values of the DC current that is delivered to the workpiece. The method allows the user to select which of the two memory lookup tables are used, based on the confirguration the welder being employed.

8 Claims, 18 Drawing Sheets

| Firing Delay | Percent I |
|---|---|
| 0 seconds | 100 |
| x | 99 |
| y | .. |
| z | 20 |
| 8.33 micro Sec | 0 |

Figure 3

| Firing Delay | Percent I |
|---|---|
| 0 seconds | 100 |
| x | 99 |
| y | .. |
| z | 20 |
| 8.33 micro Sec | 0 |

Figure 5a

| Firing Delay | Percent I |
|---|---|
| t | 100 |
| u | 99 |
| v | .. |
| w | 20 |
| 8.33 micro Sec | 0 |

Figure 5b

| Firing Delay | Percent I |
|---|---|
| p | 100 |
| q | 99 |
| r | .. |
| s | 20 |
| 8.33 micro Sec | 0 |

Figure 5c

| Firing Delay | %I ac | %I dc |
|---|---|---|
| a | 100 | 100 |
| b | 90 | 81 |
| c | 80 | 64 |
| d | 70 | 49 |
| e | 60 | 36 |
| f | 50 | 25 |
| g | 40 | 16 |
| h | 30 | 9 |
| i | 20 | 4 |
| j | 0 | 0 |

Figure 11

METHOD OF REGULATING DC CURRENT IN RESISTANCE WELDERS

TECHNICAL FIELD

The present invention generally relates to resistance type welding processes, and deals more particularly with a method for regulating the electrical current delivered to a weld in a DC type resistance welding apparatus.

BACKGROUND OF THE INVENTION

Resistance welding involves a process for joining metallic work pieces by passing electrical current therethrough. The current flow heats the work pieces and forms a molten "weld nugget". Upon termination of the welding current, the weld nugget solidifies to form the weld.

Various parameters which affect the quality and nature of the weld are controlled by a weld controller. The predominate type of weld controller presently in use utilizes a supply of alternating current (AC) electrical energy. Electrical transformers connected with the weld control function to convert the source of AC power to a relatively low voltage, with relatively high current output on the transformer secondary. The specific levels of current are often mapped out for various work piece materials, as well as for types of different types of joints such as spots, seams or butts. The weld controller is used to regulate the current to the primary of the transformer by means of an electronic switch, typically a silicon controlled rectifier (SCR). In order to accommodate alternating power, two SCRs are installed in inverse relationship, in parallel to handle the positive and negative half cycles, respectively.

In certain applications, the amount of inductance in the secondary loop of the welding transformer can be quite large and prevents achieving the necessary levels of welding current. In order to overcome this problem, the frequency in the secondary of the transformer is reduced by effectively converting the current flowing in the secondary loop to a DC current. In many cases, however, existing methods of compensating for the variations in the power factor and other electrical parameters of a given welding circuit, in order to achieve constant current control, do not perform well when applied to single phase DC welders.

There is therefore a clear need in the art for a weld control method that eliminates the above mentioned problem, and which is suitable for use with either an AC or a DC type resistance welder.

SUMMARY OF THE INVENTION

The present invention takes advantage of recognition that, in connection with a DC type resistance welder which employs a constant current control, the rate of change of the percentage of DC current applied versus the actual amount of current flowing through the workpiece is not a linear function, as is the case in a single phase, AC type welder. The method of the present invention involves generating a correction factor used to select the proper firing delay angle, which reflects the fact that the DC current values representing the percentage of maximum DC current that is available to be delivered to the workpiece possesses a nonlinear relationship to actual values of the current delivered to the workpiece. According to one aspect of the present invention, a method is provided for controlling a resistance welder which includes the steps of storing in a lookup table memory of a weld controller a set of data correlating a set of firing delay parameters with a set of DC current values representing the percentage of maximum DC current that is available to be delivered to the workpiece at a given power factor for the weld circuit, wherein the stored set of DC current values is a nonlinear function of the actual values of the DC current delivered to the workpiece.

According to another aspect of the invention, data is stored in a second lookup table memory which correlates a set of firing delay parameters with a set of AC current values representing the percentage of maximum AC current that is available to be delivered to the workpiece at a given power factor for the weld circuit, wherein the stored set of AC current values is essentially a linear function of the actual values of the AC current delivered to the workpiece. Weld firing delay angles are selected from the two lookup tables based on whether the weld controller is operating on an AC or a DC type welder.

BRIEF DESCRIPTION OF THE DRAWINGS

In the drawings, wherein like reference identify identical components in the various views:

FIG. 3 is a firing delay table for a 60 Hz welder;

FIGS. 5A, 5B and 5C respectively show firing delay tables for differing power factors;

FIG. 11 is a table showing modified firing delays employed in the method of the present invention.

DETAILED DESCRIPTION OF THE PREFERRED EMBODIMENTS

In order to fully appreciate the method of the present invention, it is necessary to have a firm understanding of the manner in which conventional weld controls operate in resistance type welders to precisely control weld currents, despite cycle-to-cycle variations of parameters that affect weld quality.

Figure 1:
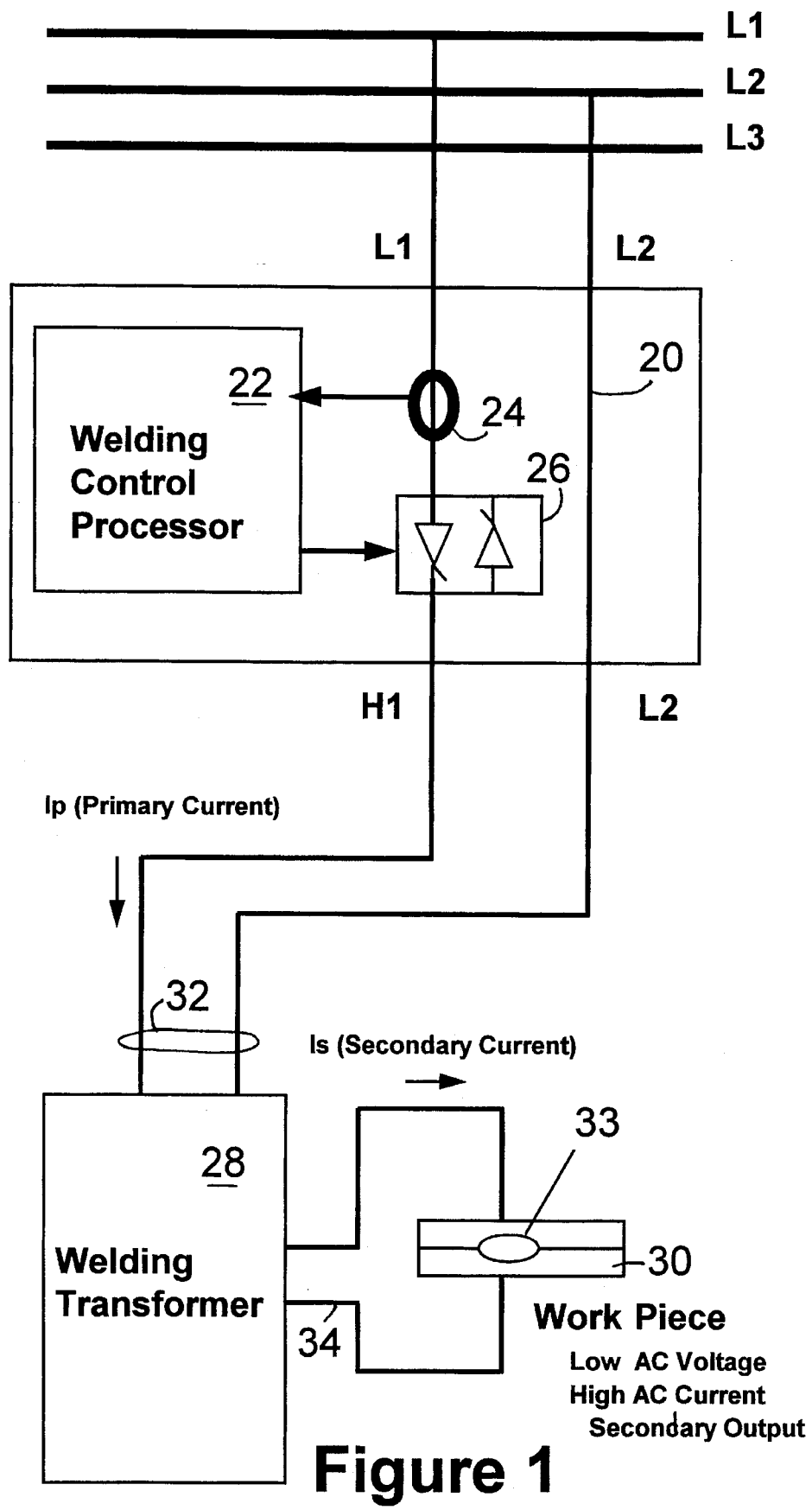
FIG. 1 is a combined block and schematic diagram of a conventional, single phase, AC type resistance welding apparatus.

As background information, the components of a conventional AC resistance welder are depicted for illustration in FIG. 1, wherein the weld control is identified by the numeral 20, which receives power from a three-phase AC power source on lines L1, L2. The weld control 20 includes a welding control processor, a primary current monitor 24 and a pair of switching SCRs 26. The switched output of the weld control 20 is delivered to the primary 32 of the welding transformer 28. The secondary output 34 of the welding transformer 28 is delivered to the workpiece 30 where the weld nugget 32 is formed.

The weld control 20 comprises a weld control processor 22 which includes a programmed microcomputer having one or more memories in which lookup tables are stored. The weld control 20 monitors several parameters, including welding bus voltage, primary or secondary current flowing the transformer 28, welder load power factor and other parameters. The desired output of the welding transformer 28 is determined by controlling the firing of SCRs 26 at an appropriate instant every half cycle of the voltage wave form. The moment of firing is sometimes referred to as the "firing delay" time.

Figure 2:
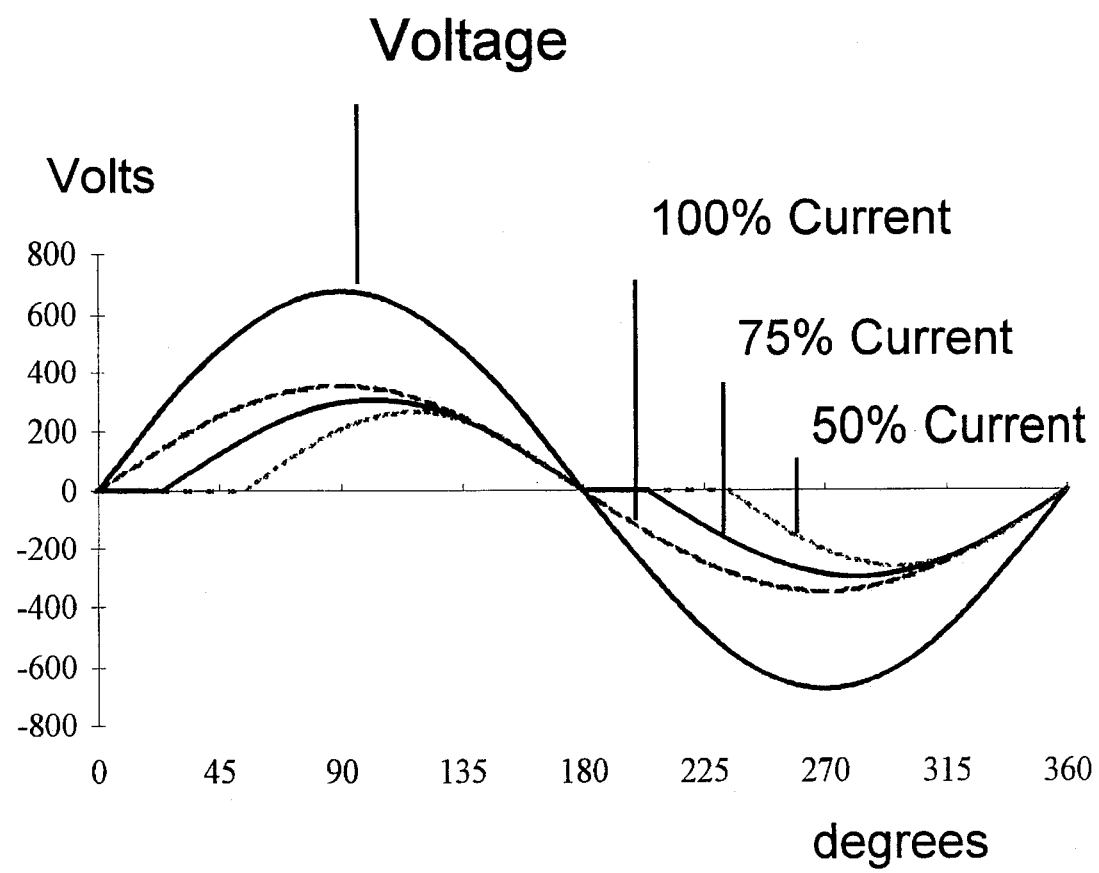
FIG. 2 is a graph depicting the flow of welding currents in the apparatus of FIG. 1, based on differing firing angles.

FIG. 2 of the accompanying drawings graphically depicts the flow of welding current in a single phase AC welder when the SCRs 26 are fired at various firing delays or "firing angles". The particular example shown in FIG. 2 corresponds to a 480 VAC 60 Hz welding bus where the load impedance is 100% resistive, thus having a power factor of 1.00. The welding current is expressed as percentage of maximum available, as would be the case when the SCRs 26 are continually gated. In FIG. 2, the current flow is plotted for three different firing angles respectively resulting in 100%, 75% and 50% of maximum available current.

Determining the firing delay for the desired outputs on a single phase AC welder requires complex mathematical solutions for various conditions. These solutions have been previously ascertained and a table of firing delays have been generated which are typically used by known resistance welding controls. Those skilled in the art will readily understand the known, complex relationships between the various inputs such as welder bus voltage, welder load power factor and the resulting current output, consequently it is not necessary to describe these details herein. For purposes of the present description, it is sufficient to appreciate that the welding control 20 includes in memory, look-up tables referred to as "firing delays" which are employed by the weld control to precisely determine the timing of the firing of SCRs. For a 60 Hz system, the complete voltage wave form measures 16.666 milliseconds. Therefore, each half cycle has a duration of 8,333 microseconds. In the case of the graph shown in FIG. 2, the first 180 degrees measures 8,333 microseconds and the complete cycle of 360 degrees measures 16,666 microseconds for the 60 Hz weld control. A typical firing delay table for a 60 Hz welder is shown in FIG. 3.

Typical tables range from 20 to 100 percent in increments of either 1 percent, 0.5 percent, 0.10 percent, etc. In FIG. 2, the 100 percent current curve is obtained at 0 microsecond delay, the 75 percent current curve is obtained at approximately 1,157 microsecond delay and the 50 percent current curve is obtained at approximately 2,546 microsecond delay. These values are merely illustrative of the manner in which firing tables are mathematically derived. The present invention described later herein, utilizes these types of firing delay tables which are resident in the memory of the weld control 20.

Resistance welding of metallic workpieces typically requires electrical current ranging in the order of 1000 to 250,000 amperes which is delivered to the welding electrodes that compress the workpiece at a preselected pressure for a prescribed time period. The specific amount of electrical current necessary to obtain an optimum weld is governed in part by the thickness and composition of metal comprising the workpiece. The thermal and electrical characteristics of the metal workpieces determine the time and intensity of the current flow.

The amount of voltage necessary to deliver the welding current is relatively low because the combined electrical resistance of the welding tool and the workpiece is likewise relatively low. The resistance of the tool is normally measured in milli or micro ohms. As previously mentioned, a welding transformer is used to provide this low voltage but at high current output. The impedance to the flow of electrical current in the secondary of the welding transformer is not entirely resistive because of the magnetic nature of the circuit. The portion of the current which is magnetic results in part from the magnetic fields induced by the high current flows through the circuit. The impedance to these magnetic fields affects the amount of primary current that eventually flow from the transformer secondary. The size of the secondary loop of the weld control circuit and the amount of magnetic materials that are placed within this loop can greatly affect the magnitude of the magnetic component of the impedance.

The proportion of the resistive component to the total impedance is a measurement of power factor. A power factor of 60 percent indicates that 60 percent of the impedance in the welding circuit is due to the resistive component, and 40 percent is due to inductance. When the power factor is less than 100 percent, there are periods when the instantaneous voltage and current are different in polarity. It is only when both voltage and current have the same polarity that energy is delivered to the weld nugget. In order to determine the firing delay for each numerical value of power factor, there is a complex mathematical relationship that must be determined in order to establish the firing delay and the percent current available. These relationships are well known in the art and need not be discussed here. It is sufficient to recognize that the weld control employs a firing delay table for each particular numerical value of the power factor. Again, these tables are contained in a memory forming part of the weld control.

Figure 4:
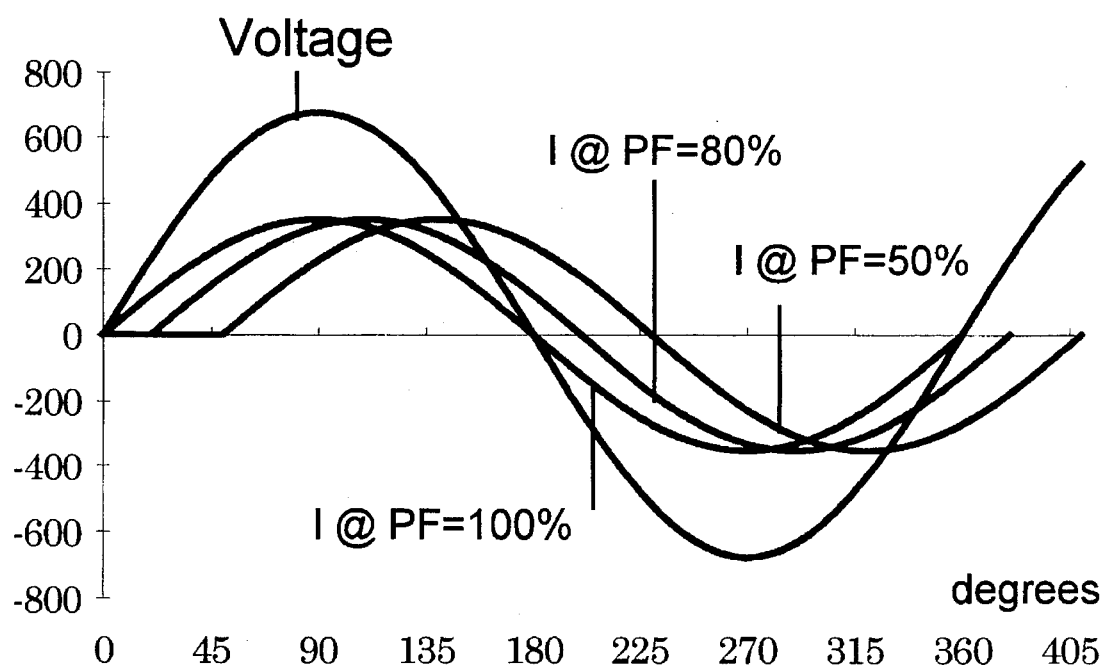
FIG. 4 is a graph depicting the relationship between current delay and the power factor of the welder of FIG. 1.

As shown in FIG. 4, the ranges of available current (0 to 100 percent) are shown for three different power factor conditions (100 percent, 80 percent and 50 percent). In this particular example, the 100 percent power factor curve possesses a firing delay ranging from 0 degrees (100% I) to 180 degrees (0% I), the 80 percent power factor has a firing delay ranging from 22 degrees (100% I) to 180 degrees (0% I), and the 50 percent power factor curve has a firing delay ranging from 48 degrees (100% I) to 180 degrees (0% I).

The tables depicted in FIGS. 5A, 5B and 5C are examples of firing delay tables for three different power factor settings (100, 80 and 50 percent). Typically, a normal weld control would employ 80 such tables for power factors ranging from 20 to 100 percent and these tables would be resident in the welding control memory as previously described.

Since the percent of current and the power factor are unique values for each welding control, it has been common practice in the past to provide in such weld control systems an automatic constant current control feature. Using this feature, the user does not have to remember specific characteristics such as the power factor or the % I which yield the target currents that are unique to each welding apparatus. Instead, the user simply programs or selects the target secondary current to be delivered to the workpiece, and the weld control processor automatically determines the gating or firing points for the SCRs 26 (FIG. 1) for each half cycle based on measurements of power factor, % I and the current flowing in the secondary of the transformer during previous weld cycles.

Figure 6:
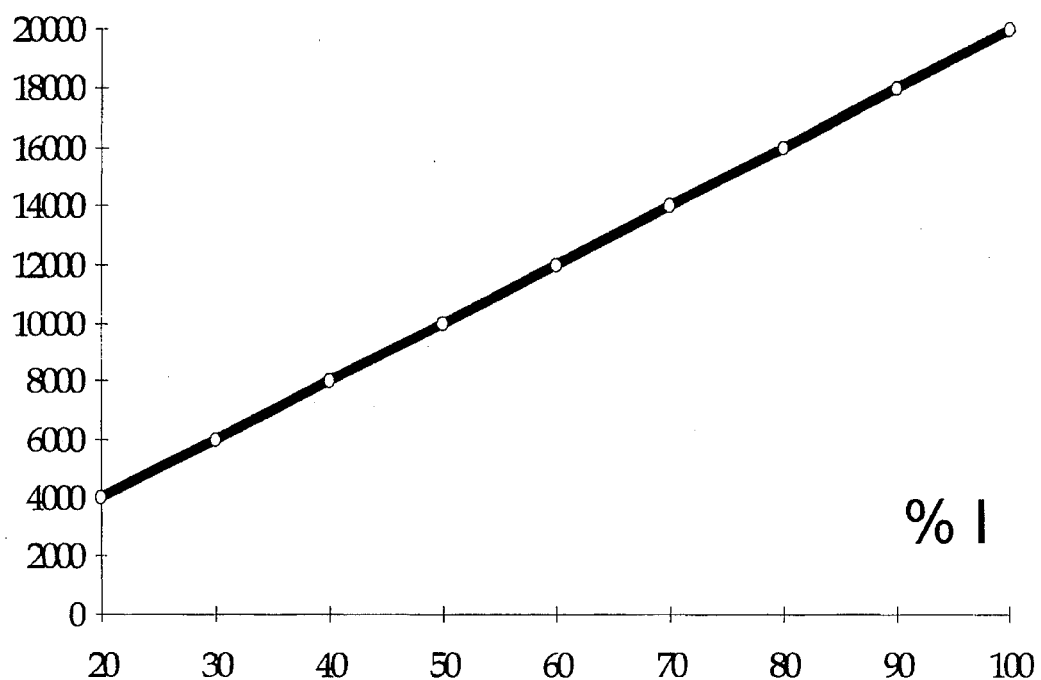
FIG. 6 is a graph of a C-Factor coefficient which depicts the linear relationship between % I and current flowing in the secondary of a transformer of the weld apparatus of FIG. 1.

When a weld control is initially activated, prior to carrying out welds on a given workpiece (i.e. no previous history of weld), the control gates the SCRs 26 at a relatively low setting for the first half cycle. This insures that excessive current is not applied to the welding electrodes or workpiece, while at the same time providing feedback information which the welding control processor 22 uses to determine the gating time for the subsequent half cycles. Based on the linearity of the relationship between percent current and the current flowing in the secondary of the AC welding apparatus of AC welding apparatus of FIG. 1, known welding controls maintain an adjustment coefficient sometimes referred to as the "C-Factor". This linear relationship is depicted in FIG. 4. Based on the fact that $$\% I = \frac{I_s \times 100}{I \max}$$

one obtains $$\frac{I \max}{100} = \frac{I \sec}{\% I}$$

the expression I sec/% I represents the instantaneous slope of the graph shown in FIG. 6. Since this graph is linear, the slope is obviously constant, and the "C-Factor" is equal to 0 since Is rises 200 amps for each 1 percent increase in the % I.

In order the weld control to provide a constant current output, the control reads for each half cycle of the supplied power, the power factor of the welding electrodes, the measured current, the measured line voltage and the % I selected. In the case of current, the control 20 measures Is directly by means of a current sensor placed at the output of the secondary of the welding transformer. After gating the SCRs 26 for a half cycle at a known % I, the control 20 reads the power factor and the current, and then calculates the C-Factor by dividing the measured Is and the selected % I. From the calculated C-Factor and based on the target current desired to be delivered to the workpiece, the weld control 20 then determines the new % I to use on the subsequent half cycle of the weld. Since the new % I and the power factor are known, the weld control 20 then consults the proper look-up table (based on the known power factor) to determine the next firing time delay which is based in part % I. Taking an illustrative example with reference to FIG. 4, assume that the weld control 20 is powered up and has no previous history of a weld. The weld control 20 therefore assumes a very low power factor and employs the lowest percent current available for the first half cycle. Let it be also assumed that the target current is set at 10,000 amperes but that during the first half cycle only 4,000 amperes is sensed at 20 % I. The weld control 20 then calculates the C-Factor of 200 and determines that 50 C-Factors would equal 10,000 amperes. Knowing the power factor after the first half cycle, the weld control 20 consults the firing delay table and determines the firing delay corresponding to the % I calculated which, in this case, is 50 percent.

It is known that the inductance of a resistance welder is proportional to the frequency of the signal, the size of the loop of the current carrying path and the amount of magnetic material that is placed within the loop. Normally, the frequency of the welding bus is typically 50 or 60 Hertz. Since most resistance welding apparatus employ the normal power lines for an energy source, reducing the frequency of the energy source on the welding bus is not possible. In some cases, it may also not be possible to reduce the size of the welding loop, as in the case where large workpieces are being fabricated such as the pavilions, walls, floors of rail vehicles. Where the material of the workpiece is magnetic or the loop area within the welding electrodes is large, it becomes impossible to obtain high levels of welding current at 50 or 60 Hertz.

Figure 7:
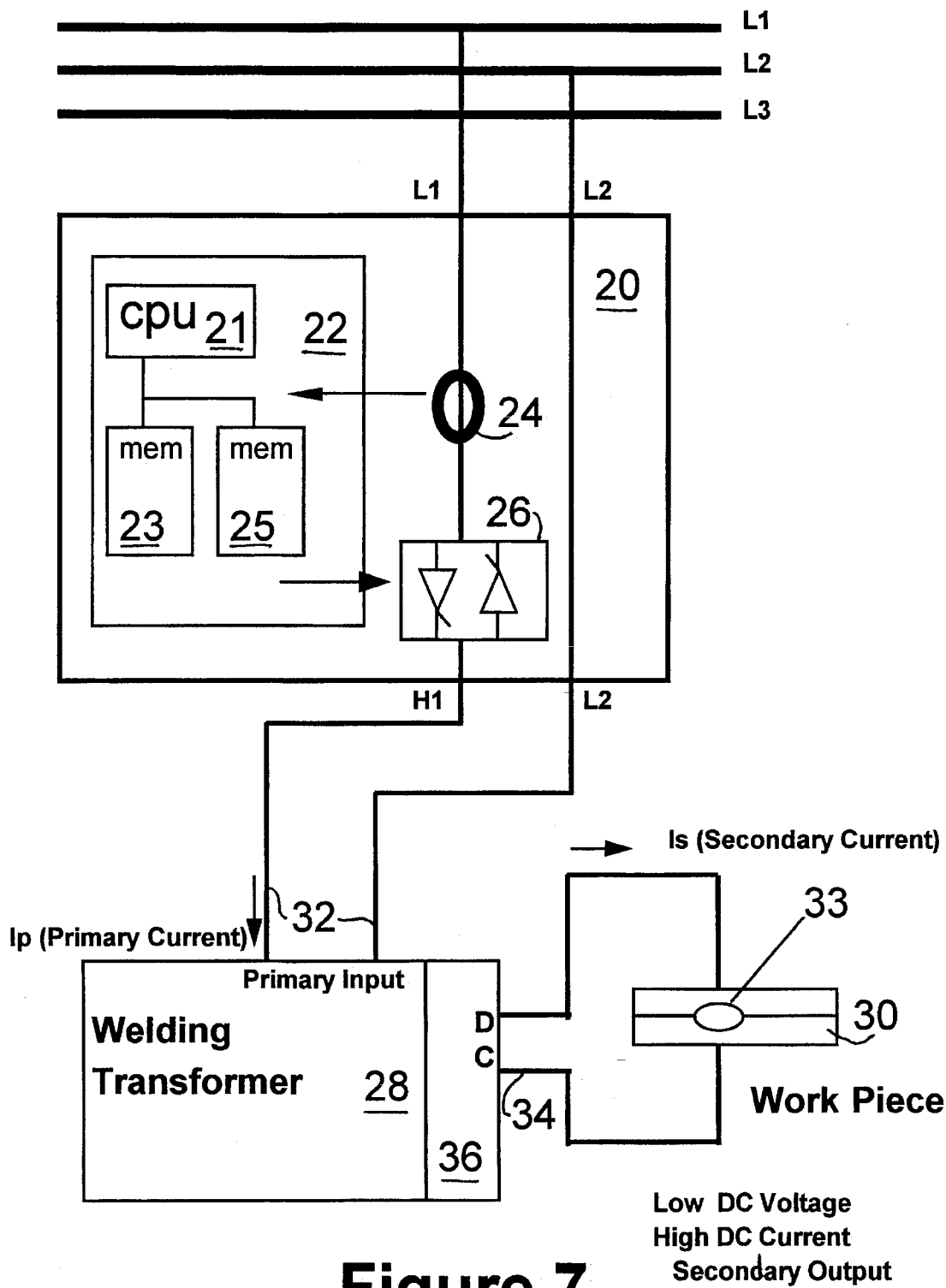
FIG. 7 is a combined block and schematic diagram of a single phase DC resistance welding apparatus.

Several solutions are possible for reducing the large amount of inductance in the secondary of the welding apparatus. One solution involves the use of a special weld control which converts the frequency output from the weld control to a lower value. However, this approach requires much larger welding transformers that in turn have large amounts of steel in core in order to withstand the longer pulse widths of the power. A more common solution to the inductive problem involves reducing the frequency of the supplied power on the secondary side of the welding transformer 28. A single phase DC resistance welding apparatus which reduces the frequency on the secondary of the welding transformer to zero is shown in FIG. 7. This welding apparatus has a weld control 20 that includes a weld processor 22 which is provided with a CPU 21 coupled by a data bus to a pair of memories 23,25 within which there may be stored later discussed look up tables. It is to be undestood, however, that these look up tables may be stored in partitioned sections of a single memory, rather than in two memories. The welding apparatus shown in FIG. 7 is otherwise identical to that depicted in FIG. 1 with the exception that a "DC pack 36" has been added on the secondary side of the welding transformer 28. This DC pack 36 includes rectifying diodes (not shown) which effectively reduce the frequency of the power from 50 or 60 Hz to 0, thereby outputting direct current on the secondary outputs 34 which are connected with the workpiece 30. While the welding apparatus of FIG. 7 operates satisfactorily for many applications, difficulties have been encountered in those applications where the user wishes to program the weld controller 20 using the constant current method described earlier. In other words, the weld controllers that have algorithms normally used for performing constant current which have proven dependable for use on single phase AC welders do not perform equally well when applied to single phase DC welders. It has been found that the AC current regulation algorithm may cause excessive changes on a cycle by cycle basis when used on DC welders.

As stated earlier, the feedback information for AC current regulation is based on the C-Factor which represents the level of current output for each percent of the maximum applied effort or current. The C-Factor of AC welders is relatively constant for the full range of applied effort (current or heat) from 20 percent current (4 percent heat) to 99 percent (98 percent heat). The relationship between the percent current and the percent heat will be discussed later herein.

In order to better understand the behavior of DC welding equipment, the inventor herein obtained welding data from several sources. The analysis of this data which will be discussed below, demonstrates the existence of a new characteristic discovered by the inventor herein which will be referred to herein as the "H-Factor". It has been found that the H-Factor is present in all single phase DC welders, regardless of the size of the loop in the secondary circuit of the apparatus. The inventor herein has successfully tested the use of the H-Factor as the basis for making adjustments for regulating current, including tests carried out in applications having very large secondary loops that introduce substantial inductive component into the system.

Figure 8A:
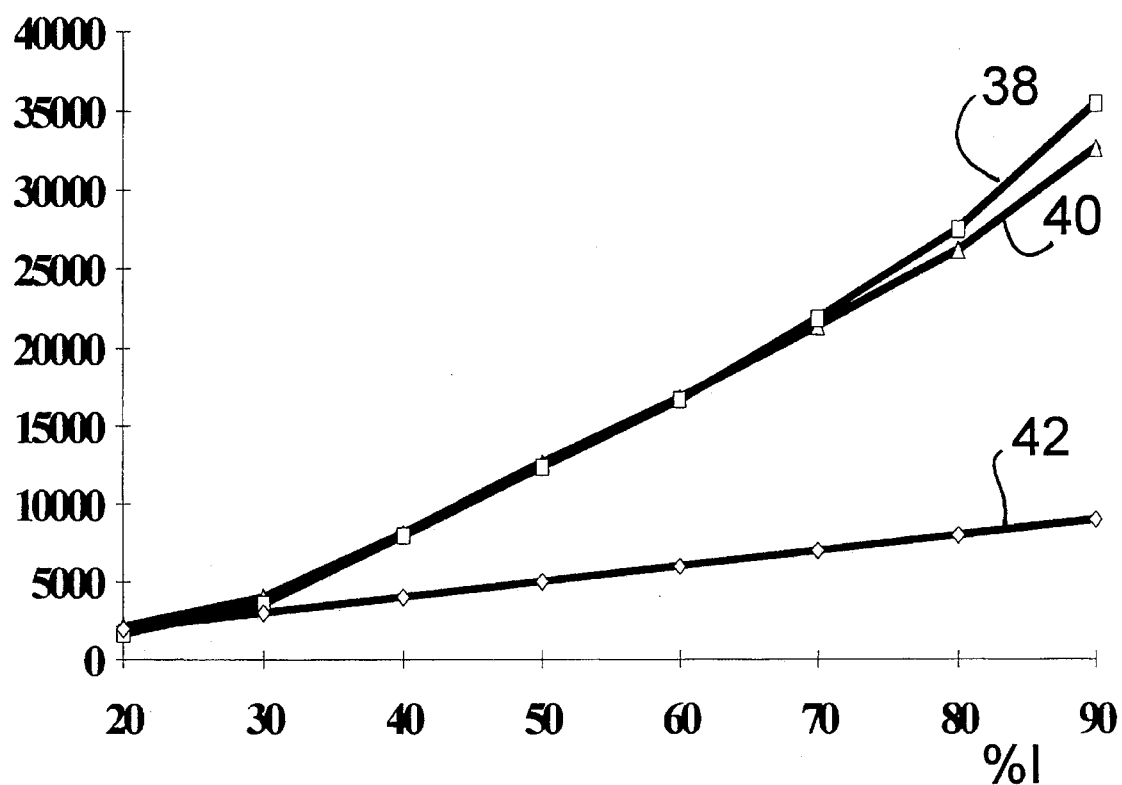
FIGS. 8A, 8B and 8C depict the relationship between the % current and secondary current for single phase DC welders respectively having small, medium and large secondary loops.

Weld data was generated for three different single phase DC resistance spot welders by firing in a voltage compensation mode for the ranges of 20 percent to 99 percent current. The results of the testing are graphically depicted in the three corresponding graphs shown in FIGS. 8A, 8B and 8C, respectively. The amount of secondary current was measured using several different instruments including a pick-up coil (not shown) mounted on the secondary output of the weld transformer 28. One of the test weld apparatus employed to generate the above-mentioned data shown in FIG. 8A possessed a relatively small secondary loop and consisted of a C-clamp gun measuring 30 inches by 18 inches deep. This loop was fed by a single phase DC transformer using a three foot kickless cable. The primary current times turns ratio was used as the measurement of current from the welding control. In FIG. 8A, the plot 38 represents data measured by the weld control's pick-up coil, while the plot 40 represents data measured by the a commercially available weld checker. It can be seen that the plots 38 and 40 are quite similar, particularly in the range of 20 to 90 percent of maximum current. For comparative purposes, a plot 42 is shown which represents a linear relationship between the secondary current and % I.

Figure 8B:
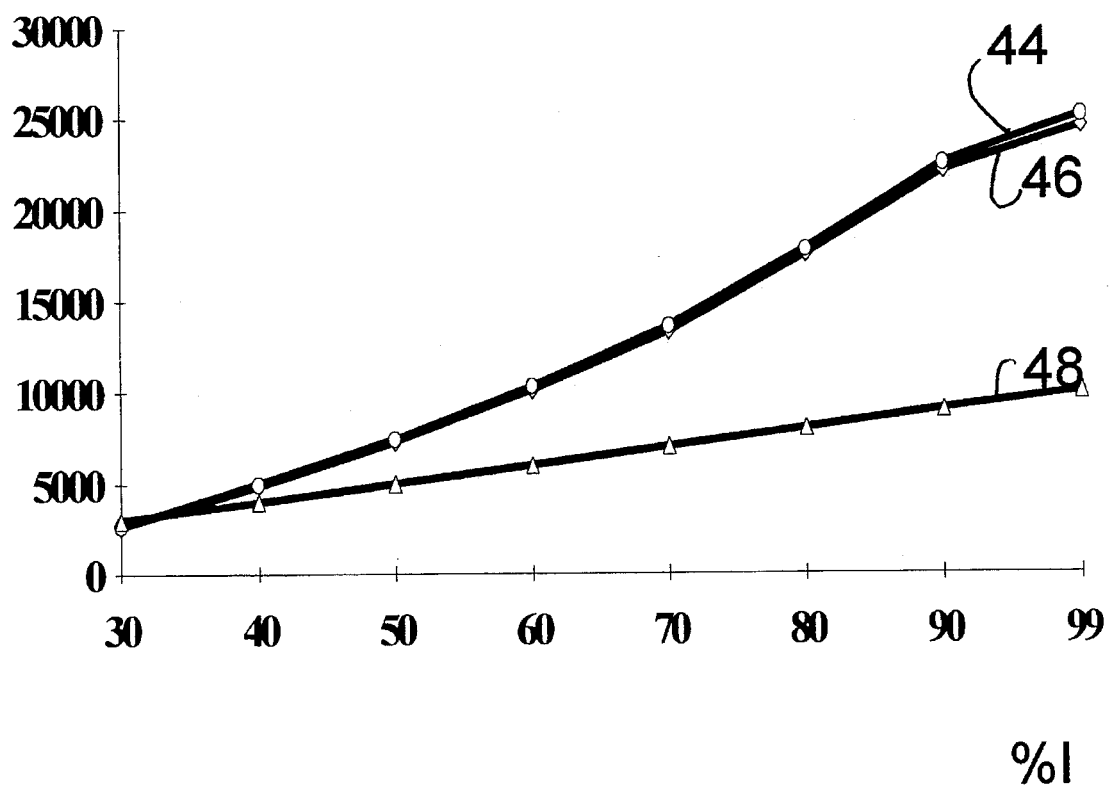

The graph shown in FIG. 8B corresponds to data taken during another test of a welder having a secondary loop which was medium in size. This welder consisted of two 18 foot long current carrying bus bars positioned parallel to each other. These bus bars were fed at each end by separate transformers having their primary windings connected in parallel to the welding control. DC secondary current was used in this particular weld control experiment. The plots 44, 46, which are almost identical, respectively represent data measured by means of the weld control's internal current sensor, and an external, independent weld current checker. Again, a linear plot 48 is shown in FIG. 8B for comparative purposes.

Figure 8C:
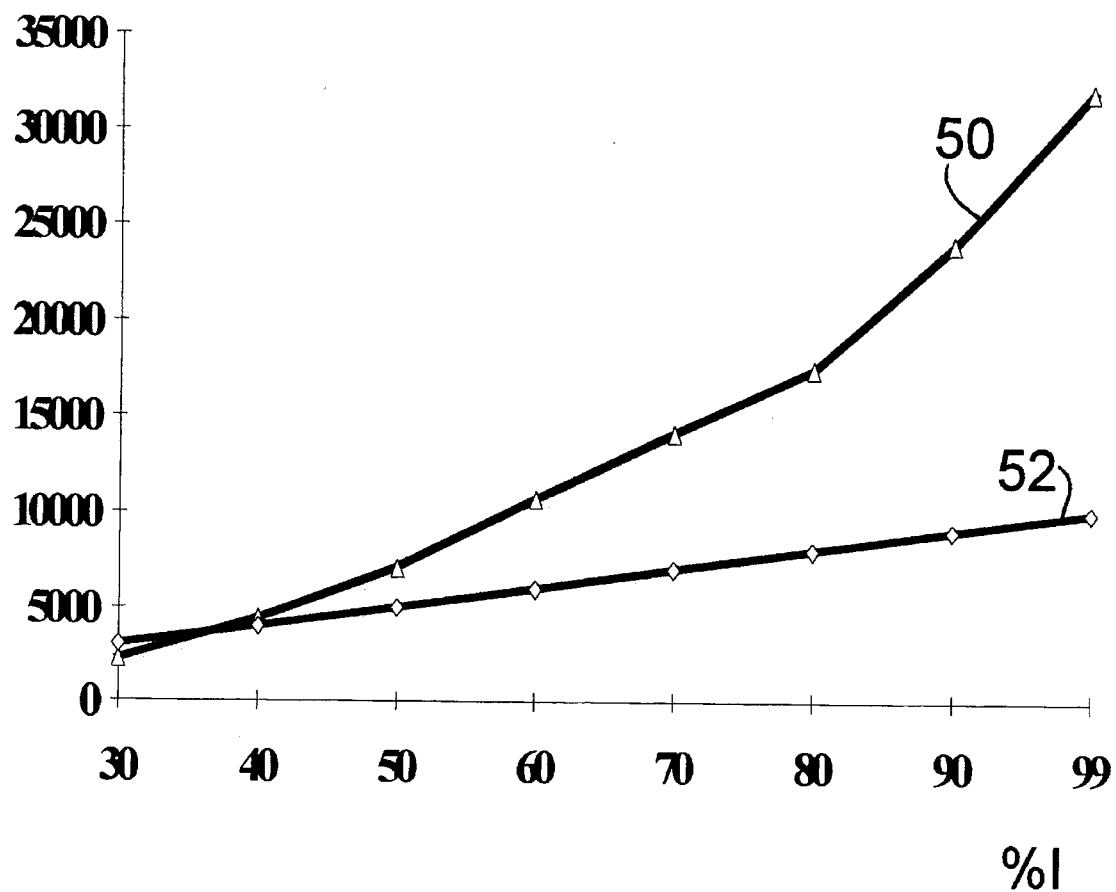

FIG. 8C depicts weld data accumulated during a third test involving a DC resistance welder having a relatively large secondary loop. Once again, the measured secondary current shown by the plot 50 can be seen to be clearly nonlinear in comparison to the linear plot 52 which is depicted for comparative purposes.

From FIGS. 8A, 8B and 8C, it may be clearly appreciated that the current flowing in the secondary for DC welders increases more rapidly than that for AC welders as a percent of maximum current. FIGS. 8A–C show that the second current over a range of % I for each welder is nonlinear, whereas had AC type welders been used in these experiments, the plots in all three graphs would reveal linear increases in the measured current. It can be seen then, that the DC secondary current rises as a square of the percent current increase. This finding seems to be consistent, regardless of the size of the loop in the secondary circuit of the welder.

Figure 9A:
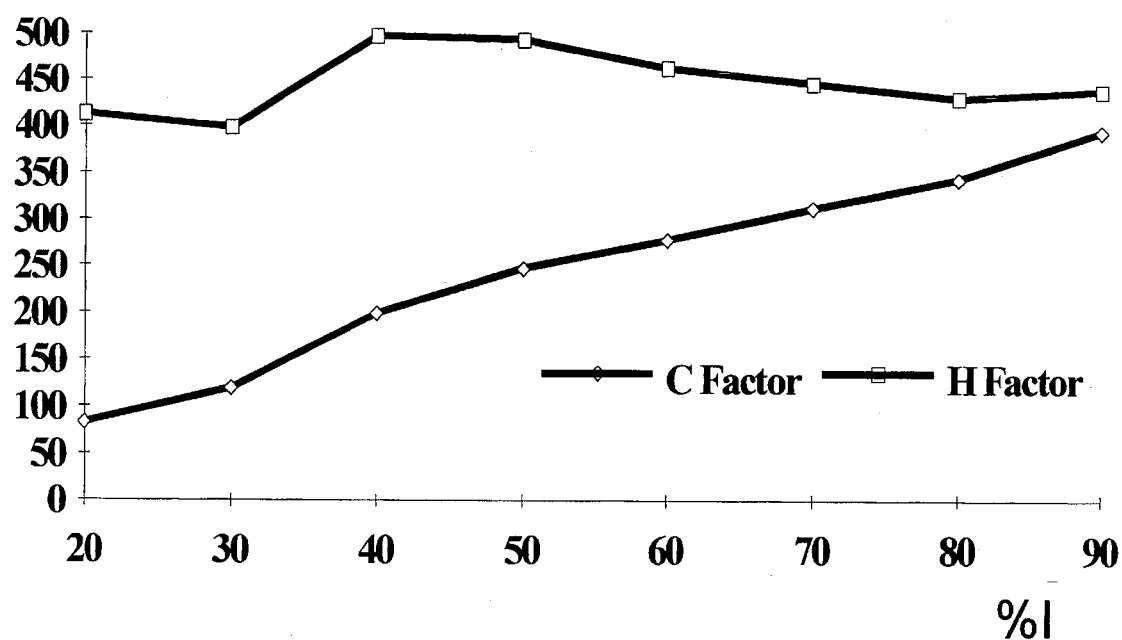
FIGS. 9A, 9B and 9C are graphs depicting the C and H factors for small, medium and large secondary transformer loops.
Figure 9B:
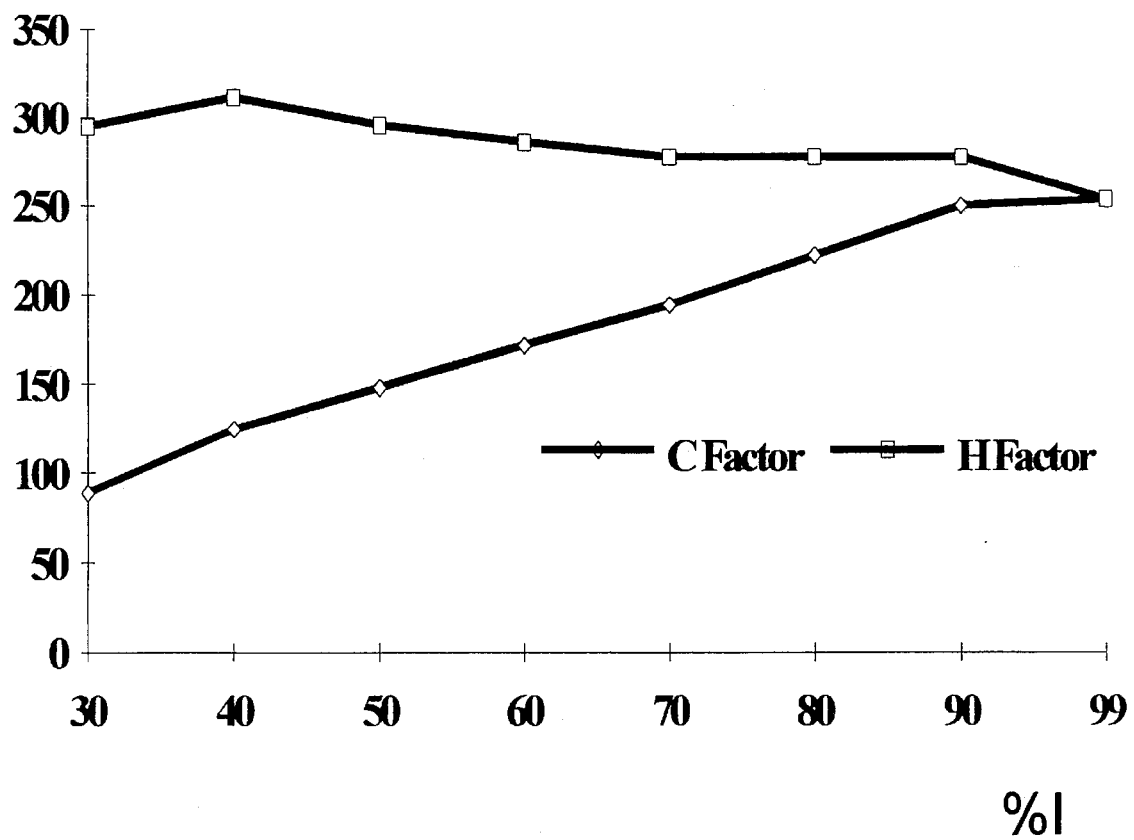
Figure 9C:
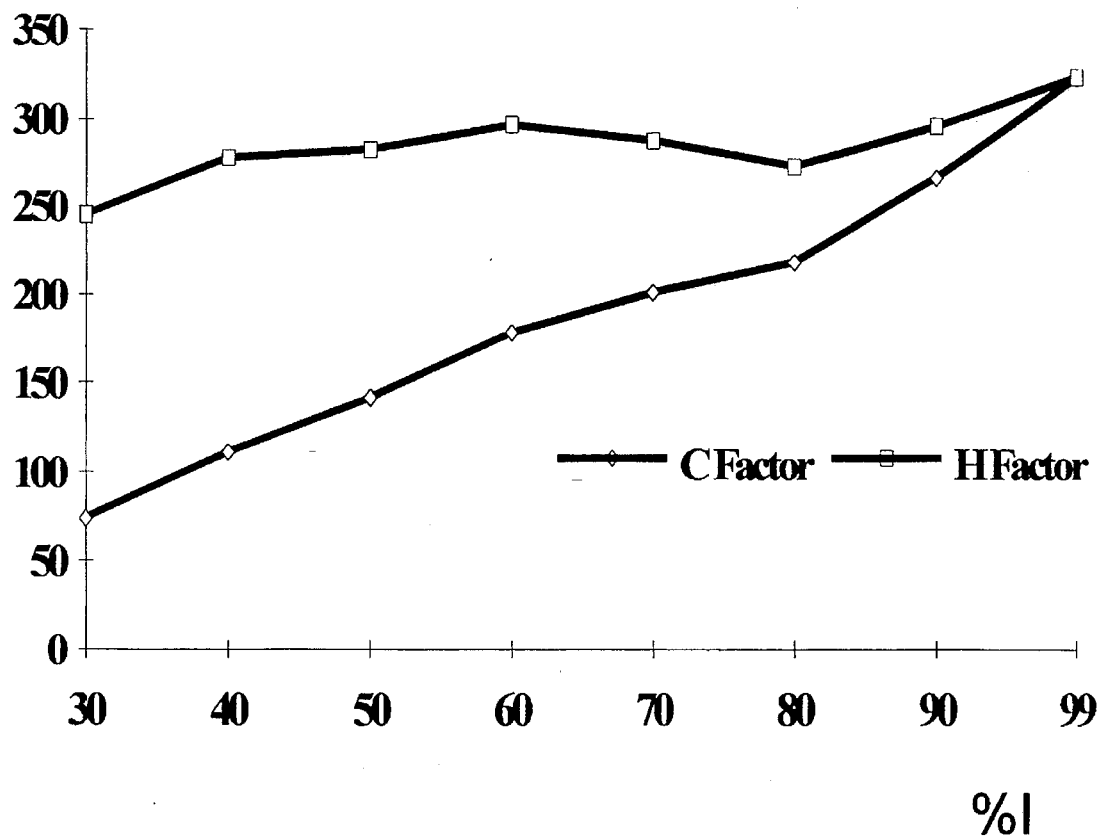

FIGS. 9A, 9B and 9C depict the plots of the C and H-Factors, respectively for the welders involved in the testing which produced the data shown in FIGS. 8A–8C. In FIGS. 9A–9C, the calculated C-Factor (i.e. Isec/% I) appears to rise linearly for the corresponding DC welders, whereas for AC welders, it is known that the C-Factor is constant. Consequently, it may be appreciated that the use of AC current regulation algorithm for DC welding applications will yield erroneous results since the coefficient that the weld control employs for determining the firing delay to obtain the desired current, changes over the range of percent current. In contrast, if when one analyzes the C-Factor changes over the range of percent current, it is found that it increases linearly.

Since the C-Factor for single phase DC welders rises linearly, it may be seen that the relationship between current and % I (set for AC) is quadratic. The derivative of the C-Factor would therefore be a constant, and it is this constant that must be used to determine the correct amount of adjustment for choosing a firing delay point.

Calculating the H-Factor (C-Factor/% I), one finds that for all loop sizes, the H-Factor is relatively constant. Applicant has referred to this characteristic as the H-Factor because it is related to the Isec/% heat. In other words, $$H\text{-Factor} = \frac{C\text{-Factor}}{\% I} = \frac{Isec}{(\% I)^2} = \frac{Isec}{\% \text{ Heat}}$$

The steps of the method of the present invention which utilize applicant's discovery of the H-Factor will be described below. The inventive method, while effective for improving the accuracy of weld controls used in DC applications may also be used in a weld control employed for AC operations. This is accomplished by making appropriate provisions in the software used to control the weld controller 20 which notifies the welding control processor 22 whether the system is being employed in a single phase AC machine of the type shown in FIG. 1, or a single phase DC machine of the type shown in FIG. 7. It is only necessary to provide a pointer in the software of the welding control 20 which determines whether the conventional C-Factor information is used for single phase AC, or whether the method of the present invention utilizing the H-Factor information is employed for single phase DC applications. Most users of prior weld controls have fixed concepts of the percent current (% I) and the C-Factor employed for single phase AC welding apparatus. Since single phase DC welding apparatus are being used with increasing frequency, some confusion may arise since the percent current and C-Factor's behave differently in these two systems. Therefore, it is perhaps helpful to redefine % I and the C-Factor for single phase DC as will now be described. It is known that the resistance welding energy is defined as:

$$E = I^2 rt$$

where I represents current, r represents the resistance of the workpiece and t represents the time for current flow. The percent current (% I) refers to the portion of the current that is available. If the maximum available current in a welder is 20,000 amperes for example, then 100% I corresponds to 20,000 amperes. Therefore it follows, for example, that 50% I corresponds to 10,000 amperes. If the resistance and time remain the same, but variations in current are experienced, the change in energy (or heat) would likewise be changed. This change, however, will be quadratic, rather than linear. For example, if the current changes from 20,000 amperes to 10,000 amperes, it would be one-quarter, rather than one-half of the heat present. The following table, for example, translates the % I into % heat:

| % I | 20 | 30 | 40 | 50 | 60 | 70 | 80 | 90 | 99 |
|---|---|---|---|---|---|---|---|---|---|
| % H | 4 | 9 | 16 | 25 | 36 | 49 | 64 | 81 | 98 |

Figure 10:
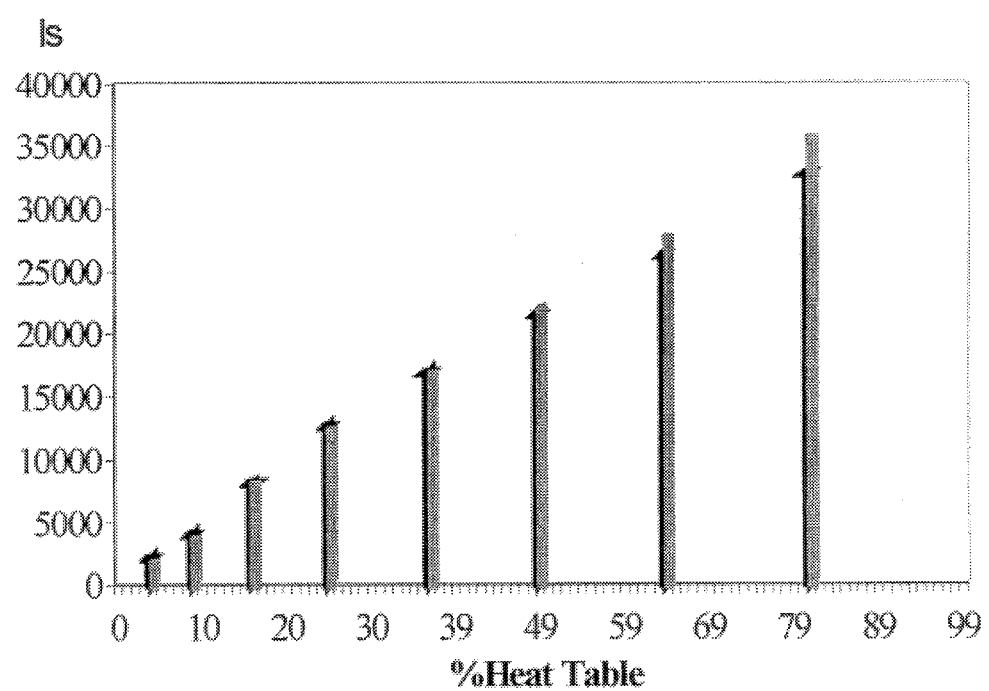
FIG. 10 is a graph showing the linear relationship between current and the % heat for a small secondary loop.

Since the % Heat is a quadratic function of the % I, it follows that if one plotted the current measured in the experiments corresponding to FIGS. 8A–8C over the range of % Heat (instead of % I) one obtains a linear relationship of the type shown in FIG. 10, which clearly shows the linear relationship between current and percent heat for a small loop DC secondary.

Based on the above, the % Heat table commonly found in AC control algorithms may be employed as the % I table for a DC control algorithm. It therefore follows that the H-Factor found in the data for DC welders is actually that for the C-Factor since the factor is calculated on the basis of the % I, rather than % Heat. Thus, one can relabel the preceding terms so that % I is % Iac, and % Heat is % Idc.

As mentioned earlier, a look-up table exists for each monitored power factor. In connection with the method of the present invention, the implementing software employs a pointer in the set-up parameters that make reference to whether the welding the apparatus is an AC welder or a DC welder. A typical firing delay table using the method of the present invention and the information discussed above is shown in FIG. 11 where, for a given power factor, xx, and a plurality of firing delays a–j a % Iac value is provided for AC welders (middle column) and parameters are provided for % Idc used in DC welders (right column).

Figure 12:
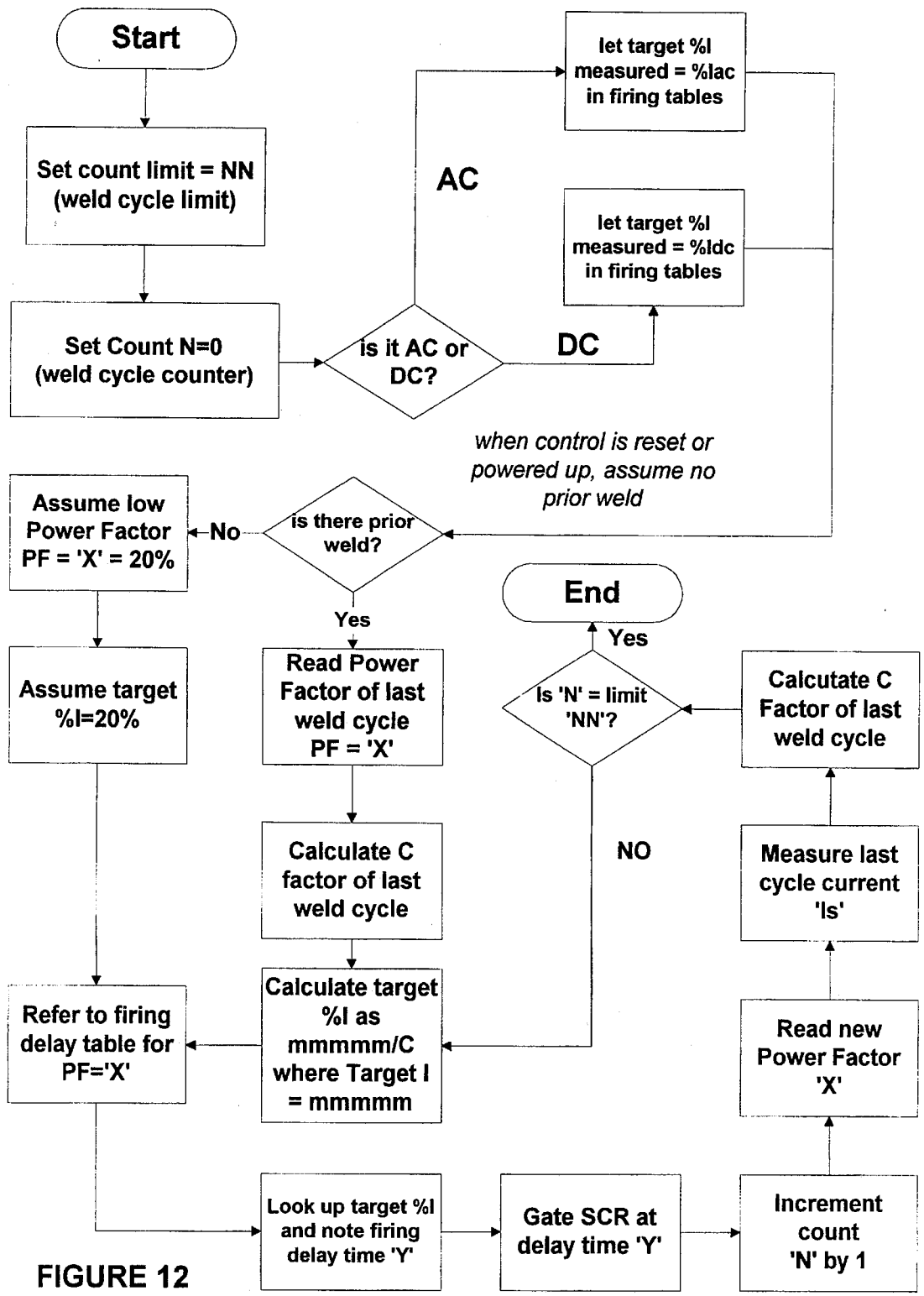
FIG. 12 is a block diagram showing the steps comprising the method of the present invention.

Reference is now made to FIG. 12 which depicts a flow chart of steps comprising the method of the present invention as applied to a conventional resistance weld control which renders the weld control capable of operating with either an AC or DC output on the secondary of the welding transformer.

After start-up of the weld control, the weld cycle limit count is set at a preselected value NN, and the weld cycle counter is set to 0. Then, a determination is made of whether the ensuing welding sequence will be carried out in an AC or DC mode. If the mode is to be AC, the target % I measured is set equal to the % Iac in the firing delay tables, and the program proceeds to determine whether a prior weld has been carried out. If there was no prior weld, it is assumed that the power factor is relatively low, i.e. 20 percent and the assumed target % I is said equal to 20 percent. Then, reference is made to a firing delay look-up table for the corresponding power factor. If, however, a prior weld has been recorded, then the power factor of the last weld cycle is read and set to a given value ("x"). Then, the C-Factor of the last weld cycle is calculated followed by the calculation of the target % I as a function of mmmmmm/C. After the firing delay look-up table has been consulted for the power factor "x" and the look-up table in memory is consulted to determine the target % I, a firing delay time "Y" is retrieved which is then used to gate the SCRs. Following the gating of the SCRs, the weld cycle counter is incremented by 1 and a new power factor is then determined. The current is then determined for the last cycle, following which the C-Factor of the last weld cycle is calculated. If the number of weld cycles is equal to the weld cycle limit "NN" the welding process is terminated, otherwise the target % I as mmmmmm/C is recalculated.

In the event that the user employs the weld control for a DC type welding application, after the weld cycle counter is set to 0, the target % I measured is set equal to the % Idc in the firing delay tables, thereby making the necessary adjustment to incorporate the H-Factor previously described.

Those skilled in the art will recognize that various modifications and enhancements may be made to the inventive method of the present invention without departing from the spirit and scope thereof. It is therefore understood that the protection sought and to be afforded hereby shall be deemed to extend to the subject matter claimed and all equivalents thereof fairly within the scope of the invention.

I claim:

1. A method of controlling a resistance welder of the type having a transformer provided with a primary coupled through a switch to a source of alternating current electrical power, a secondary, a weld controller for controlling the switch and means for delivering DC current from the transformer secondary to a workpiece to be welded, comprising the steps of:

(A) storing in a look up table memory of the controller a set of data correlating a set of firing delay parameters with a set of DC current values representing the percentage of maximum DC current that is available to be delivered to the workpiece at a given power factor for the weld circuit, wherein the stored set of DC current values is a nonlinear function of the actual values of the DC current delivered to the workpiece;

(B) retrieving from the lookup table memory a firing delay parameter;

(C) controlling the switch in accordance with the firing delay parameter retrieved in step (B) to deliver a pulse of weld energy to the workpiece;

(D) incrementing a counter to reflect the delivery of the weld energy pulse; and, (E) repeating steps (C) and (D) until the count of the counter corresponds to a prescribed number of weld cycles.

2. The method of claim 1, wherein step (A) is peformed for a plurality of power factors and the method further includes the step of determining the power factor of the weld circuit after the delivery of each weld pulse to the workpiece.

3. The method of claim 1, including the step of initially selecting a power factor value that will result in the retrieval in step (B) of a value that represents a relatively low portion of the maximum DC current available to be delivered to the workpiece.

4. The method of claim 1, including the steps of: measuring the value of the DC current delivered to the workpiece; determining the power factor of the weld circuit; producing a correction factor using the measured DC current and the selected percentage of maximum available current; selecting a new value of the percentage of maximum available current value; and, retrieving from the lookup table memory a new firing delay angle.

5. A method of controlling a resistance welder of the type having a transformer provided with a primary coupled through a switch to a source of alternating current electrical power, a secondary, a weld controller for controlling the switch and means for delivering a pulse of either AC or DC current from the transformer secondary to a workpiece to be welded, comprising the steps of:

(A) storing in a first look up table memory of the controller a set of data correlating a set of firing delay parameters with a set of DC current values representing the percentage of maximum DC current that is available to be delivered to the workpiece at a given power factor for the weld circuit, wherein the stored set of DC current values is a nonlinear function of the actual values of the DC current delivered to the workpiece;

(B) storing in a second look up table memory of the controller a set of data correlating a set of firing delay parameters with a set of AC current values representing the percentage of maximum AC current that is available to be delivered to the workpiece at a given power factor for the weld circuit, wherein the stored set of AC current values is essentially a linear function of the actual values of the AC current delivered to the workpiece;

(C) selecting whether the current to be delivered to the weld is to be a DC current pulse or an AC current pulse;

(D) retrieving a firing delay parameter from one of the first and second lookup tables based on the selection made in step (C);

(E) controlling the switch in accordance with the firing delay parameter retrieved in step (D) to deliver a pulse of weld energy to the workpiece;

(F) incrementing a counter to reflect the delivery of the weld energy pulse; and, (G) repeating steps (D), (E) and (F) until the count of the counter corresponds to a prescribed number of weld cycles.

6. The method of claim 5, wherein steps (A) and (B) are peformed for a plurality of power factors and the method further includes the step of determining the power factor of the weld circuit after the delivery of each weld pulse to the workpiece.

7. The method of claim 5, including the step of initially selecting a power factor value that will result in the retrieval in step (D) of a value that represents a relatively low portion of the maximum current available to be delivered to the workpiece.

8. The method of claim 5, including the steps of: measuring the value of the current delivered to the workpiece; determining the power factor of the weld circuit; producing a correction factor using the measured current and the selected percentage of maximum available current; selecting a new value of the percentage of maximum available current value; and, retrieving from the lookup table memory a new firing delay angle.

* * * * *